United States Patent
Mutikainen et al.

(10) Patent No.: US 9,872,213 B2
(45) Date of Patent: Jan. 16, 2018

(54) METHODS AND APPARATUS FOR WIRELESS CONNECTION MANAGEMENT

(71) Applicant: Nokia Technologies Oy, Espoo (FI)

(72) Inventors: Jari Mutikainen, Lepsämä (FI); Esa Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/505,360

(22) PCT Filed: Aug. 25, 2014

(86) PCT No.: PCT/IB2014/064056
§ 371 (c)(1),
(2) Date: Feb. 21, 2017

(87) PCT Pub. No.: WO2016/030718
PCT Pub. Date: Mar. 3, 2016

(65) Prior Publication Data
US 2017/0272990 A1     Sep. 21, 2017

(51) Int. Cl.
*H04W 36/00*     (2009.01)
*H04W 36/04*     (2009.01)
(Continued)

(52) U.S. Cl.
CPC ........... *H04W 36/04* (2013.01); *H04W 16/32* (2013.01); *H04W 36/30* (2013.01);
(Continued)

(58) Field of Classification Search
CPC ..... H04W 36/04; H04W 16/32; H04W 36/30; H04W 76/021; H04W 76/025;
(Continued)

(56) References Cited

U.S. PATENT DOCUMENTS 6,151,314 A * 11/2000 Rauhala ................ H04L 49/254
                                                                370/350
8,937,936 B2 * 1/2015 Czaja ...................... H04L 7/041
                                                                370/350
(Continued)

FOREIGN PATENT DOCUMENTS

EP          2514164 A1 * 10/2012  ............. H04K 47/14
WO       2014090335 A1     6/2014
(Continued)

OTHER PUBLICATIONS

International Search Report and Written Opinion received for corresponding Patent Cooperation Treaty Application No. PCT/IB2014/064056, dated Jun. 30, 2015, 16 pages.

*Primary Examiner* — Mahendra Patel
(74) *Attorney, Agent, or Firm* — Nokia Technologies Oy

(57) ABSTRACT

Improved systems and techniques for dual connection to a wireless communications network. In a wireless network comprising one or more macro base stations and secondary base stations, a user device indicates capability to operate and readiness to initiate an alternative multipath transfer control protocol connection. Radio access network procedures provide for communication between a core network, radio access network, and user device to indicate that bearers are being used for, or authorized for use in, an alternative multipath connection and to establish a radio bearer context. In embodiments of the invention, a bearer for alternative multipath connection is established only when a secondary base station becomes available and when a network operator has allowed the use of multipath connection. When a user device indicates that it is ready for multipath connections, core network elements establish bearers, with the alternative connection released when connection to the secondary base station is lost.

20 Claims, 6 Drawing Sheets

(51) Int. Cl.
*H04W 76/02* (2009.01)
*H04W 16/32* (2009.01)
*H04W 36/30* (2009.01)
*H04W 88/08* (2009.01)

(52) U.S. Cl.
CPC ....... *H04W 76/021* (2013.01); *H04W 76/025* (2013.01); *H04W 88/08* (2013.01)

(58) Field of Classification Search
CPC ... H04W 88/08; H04W 76/022; H04W 36/00; H04W 76/02; H04W 36/0027; H04W 36/28; H04W 36/08
USPC ..... 455/436, 338, 422.1; 370/392, 328, 350; 709/224
See application file for complete search history.

(56) References Cited

U.S. PATENT DOCUMENTS

| | | | | |
|---|---|---|---|---|
| 2011/0252151 | A1* | 10/2011 | Lu | H04W 80/045 709/228 |
| 2012/0051323 | A1* | 3/2012 | Wolfner | H04W 76/021 370/331 |
| 2014/0010207 | A1* | 1/2014 | Horn | H04W 36/165 370/332 |
| 2014/0080484 | A1* | 3/2014 | Centonza | H04W 76/045 455/436 |
| 2014/0153489 | A1* | 6/2014 | Perras | H04W 60/00 370/328 |
| 2014/0169330 | A1* | 6/2014 | Rommer | H04W 36/08 370/331 |
| 2014/0204927 | A1* | 7/2014 | Horn | H04W 8/26 370/338 |
| 2014/0206361 | A1* | 7/2014 | Centonza | H04W 76/045 455/444 |
| 2015/0131535 | A1* | 5/2015 | Wallentin | H04W 76/025 370/329 |
| 2015/0312383 | A1* | 10/2015 | Roeland | H04L 69/18 370/331 |

FOREIGN PATENT DOCUMENTS

| | | | |
|---|---|---|---|
| WO | WO 2014090335 A1 * | 6/2014 | ............. H04L 69/18 |
| WO | WO 2014092626 A1 * | 6/2014 | ......... H04W 76/025 |
| WO | 2014092626 A1 | 9/2014 | |

\* cited by examiner

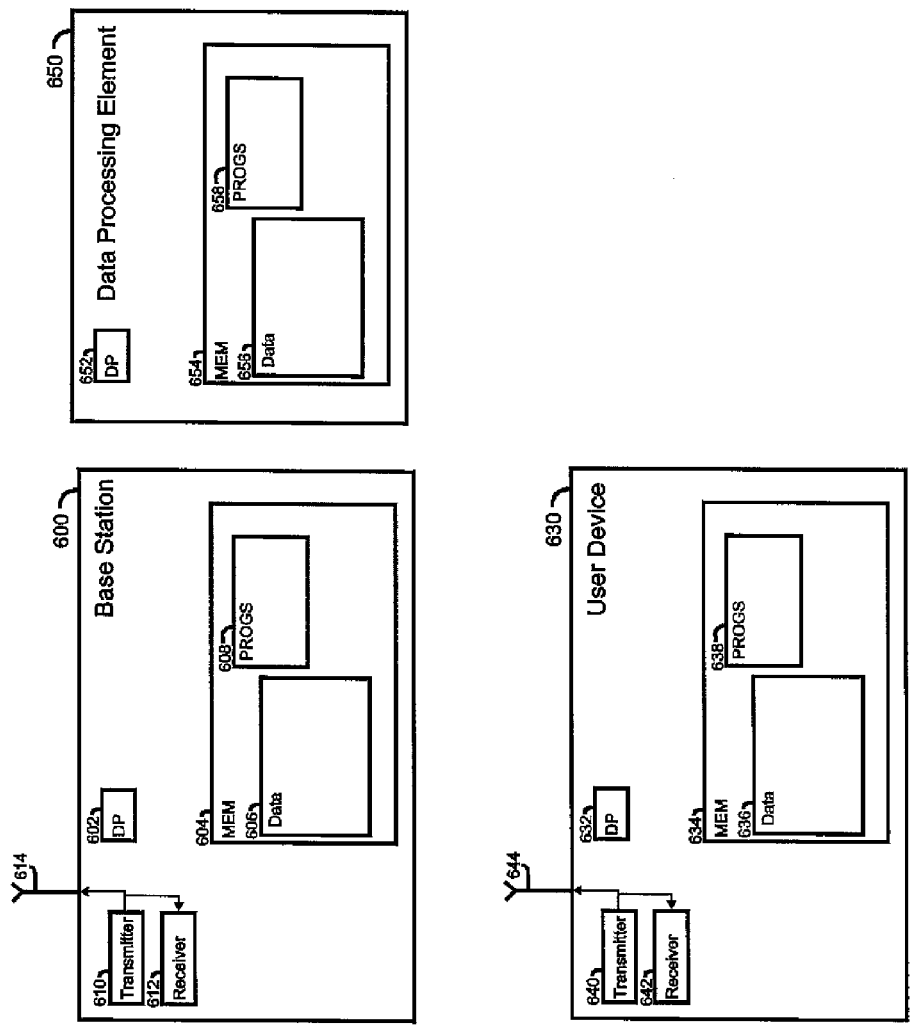

METHODS AND APPARATUS FOR WIRELESS CONNECTION MANAGEMENT

RELATED APPLICATION

This application was originally filed as Patent Cooperation Treaty Application No. PCT/IB2014/064056 filed Aug. 25, 2014.

TECHNICAL FIELD

The present invention relates generally to wireless communication. More particularly, the invention relates to improved systems and techniques for simultaneous use of radio resources from multiple base stations.

BACKGROUND

The increasing number of wireless network users and their continually increasing demands for service has led network operators to constant efforts to increase the efficiency with which they use resources, particularly the frequency resources that are allocated to wireless network services. One approach that has gained considerable favor is dual connectivity. A single large base station, often referred to as a macro base station or macro eNB in systems operating according to third generation partnership project (3GPP), 3GPP long term evolution (LTE), and 3GPP LTE advanced (LTE-A) standards, may define a macro cell, and within the physical area of the macro cell, a number of smaller, lower power base stations, known as pico base stations or pica eNBs, may be deployed. These pico eNBs define pico cells, with each pico cell having an area whose area lies within and overlaps that of the macro cell. A user device, also known as a UE, may simultaneously connect to a macro eNB and a pico eNB, using radio resources from both to obtain greater throughput. The use of such dual connectivity requires choices to be made to address establishment of radio bearers and directing of traffic to the bearers.

SUMMARY

In one embodiment of the invention, a method comprises, at a core network operating in a wireless communications network comprising one or more macro base stations and one or more secondary base stations, configuring an alternative connection indication, wherein the alternative connection indication specifies that one or more radio bearers assigned to a packet data network connection may be used for alternative parallel packet data network connections to a single access point name, receiving a connection request originating at a user device, wherein the request includes an indication that the user device includes an indication that the user device is able and prepared to use a parallel connection when a secondary base station becomes available, and configuring a connection request response including the alternative connection indication, such that the connection request response including the alternative connection indication is provided to the user device in response to a connection request indicating capability and preparedness for the user device to use an alternative packet data network connection to a single access point name.

In another embodiment of the invention, a method comprises forwarding, from a macro base station in a wireless communications network comprising the macro base station and one or more secondary base stations, to a core network controlling the wireless communications network, a request from a user device to establish one or more bearers for a packet data network connection by the user device to an access point name, in response to receiving from the core network an indication of authorization to establish one or more radio bearers for alternative packet data connection for the user device to the access point name, establishing a radio bearer context comprising one or more radio bearers for the alternative packet data connection, establishing a packet data connection between the macro base station and the user device using the one or more radio bearers, and, in response to detection that a secondary base station is available for connection by the user device, handing over at least one of the one or more bearers to the secondary base station.

In another embodiment of the invention, a method comprises sending from a user device to a wireless communications network comprising a macro base station and one or more secondary base stations, one or more requests for a packet data network connection, wherein at least one of the requests indicates that a parallel data connection is desired, establishing a packet data network connection with a macro base station using at least a first bearer, and, in response to a handover from the macro base station to the secondary base station, initiating a parallel connection with the macro base station.

In another embodiment of the invention, an apparatus comprises at least one processor and memory storing a program of instructions. The memory storing the program of instructions is configured to, with the at least one processor, cause the apparatus to at least control a core network operating in a wireless communications network comprising one macro base stations and one or more secondary base stations, to configure an alternative connection indication, wherein the alternative connection indication specifies that one or more radio bearers assigned to a packet data network connection may be used for an alternative parallel packet data network connection to a single access point name, control the core network to receive a connection request originating at a user device, wherein the request includes an indication that the user device includes an indication that the user device is able and prepared to use a parallel connection when a secondary base station becomes available, and control the core network to configure a connection request response including the alternative connection indication, such that the connection request response including the alternative connection indication is provided to the user device in response to the connection request indicating capability and preference for a user device to use an alternative packet data network connection to a single access point name.

In another embodiment of the invention, an apparatus comprises at least one processor and memory storing a program of instructions. The memory storing the program of instructions is configured to, with the at least one processor, cause the apparatus to at least control a macro base station in a wireless communications network comprising the macro base station and one or more secondary base stations, to a core network controlling the wireless communications network, a request from a user device to establish one or more bearers for a packet data network connection by the user device to an access point name, control the base station to, in response to receiving from the core network an indication of authorization to establish one or more radio bearers for alternative packet data connection for the user device to the access point name, establish a radio bearer context comprising one or more radio bearers for the alternative packet data connection, control the base station to establish a packet data connection between the macro base station and the user device using the one or more radio bearers, and, in response to detection that a secondary base station is available for connection by the user device, control the base station to hand over at least one of the one or more bearers to the secondary base station.

In another embodiment of the invention, an apparatus comprises at least one processor and memory storing a program of instructions. The memory storing the program of instructions is configured to, with the at least one processor, cause the apparatus to at least control a user device to send to a wireless communications network comprising a macro base station and one or more secondary base stations, a request for a packet data network connection, wherein the request comprises an indication that the user device is capable of alternative packet data network connection and prepared to establish an alternative packet data network connection to a single access point name when possible, control the user device to establish a packet data network connection with a macro base station using at least a first bearer, and control the user device to, in response to a handover from the macro base station to the secondary base station, initiating a parallel connection with the macro base station if a parallel connection is allowed by the network.

In another embodiment of the invention, a computer readable medium stores a program of instructions. Execution of the program of instructions by a processor causes an apparatus to at least control a core network operating in a wireless communications network comprising one macro base stations and one or more secondary base stations, to configure an alternative connection indication, wherein the alternative connection indication specifies that one or more radio bearers assigned to a packet data network connection may be used for an alternative parallel packet data network connection to a single access point name, control the core network to receive a connection request originating at a user device, wherein the request includes an indication that the user device includes an indication that the user device is able and prepared to use a parallel connection when a secondary base station becomes available, and control the core network to configure a connection request response including the alternative connection indication, such that the connection request response including the alternative connection indication is provided to the user device in response to a connection request indicating capability and preference for the user device to use an alternative packet data network connection to a single access point name.

In another embodiment of the invention, a computer readable medium stores a program of instructions. Execution of the program of instructions by a processor causes an apparatus to at least control a macro base station in a wireless communications network comprising the macro base station and one or more secondary base stations, to a core network controlling the wireless communications network, a request from a user device to establish one or more bearers for a packet data network connection by the user device to an access point name, control the base station to, in response to receiving from the core network an indication of authorization to establish one or more radio bearers for alternative packet data connection for the user device to the access point name, establish a radio bearer context comprising one or more radio bearers for the alternative packet data connection, control the base station to establish a packet data connection between the macro base station and the user device using the one or more radio bearers, and, in response to detection that a secondary base station is available for connection by the user device, control the base station to hand over at least one of the one or more bearers to the secondary base station.

In another embodiment of the invention, a computer readable medium stores a program of instructions. Execution of the program of instructions by a processor causes an apparatus to at least control a user device to send to a wireless communications network comprising a macro base station and one or more secondary base stations, a request for a packet data network connection, wherein the request comprises an indication that the user device is capable of alternative packet data network connection and prepared to establish an alternative packet data network connection to a single access point name when possible, control the user device to establish a packet data network connection with a macro base station using at least a first bearer, and control the user device to, in response to a handover from the macro base station to the secondary base station, initiating a parallel connection with the macro base station if a parallel connection is allowed by the network.

BRIEF DESCRIPTION OF THE DRAWINGS

FIG. 6 illustrates elements that may be used to carry out embodiments of the present invention.

DETAILED DESCRIPTION

Embodiments of the present invention address management of radio resources in dual connectivity arrangements. Various alternative approaches to such dual connectivity have been discussed, but the discussions have not addressed establishment of radio bearers used in dual connectivity, or the direction of traffic to the bearers. Embodiments of the present invention provide improved approaches for dual connectivity, and address establishment and management of radio bearers.

Figure 1:
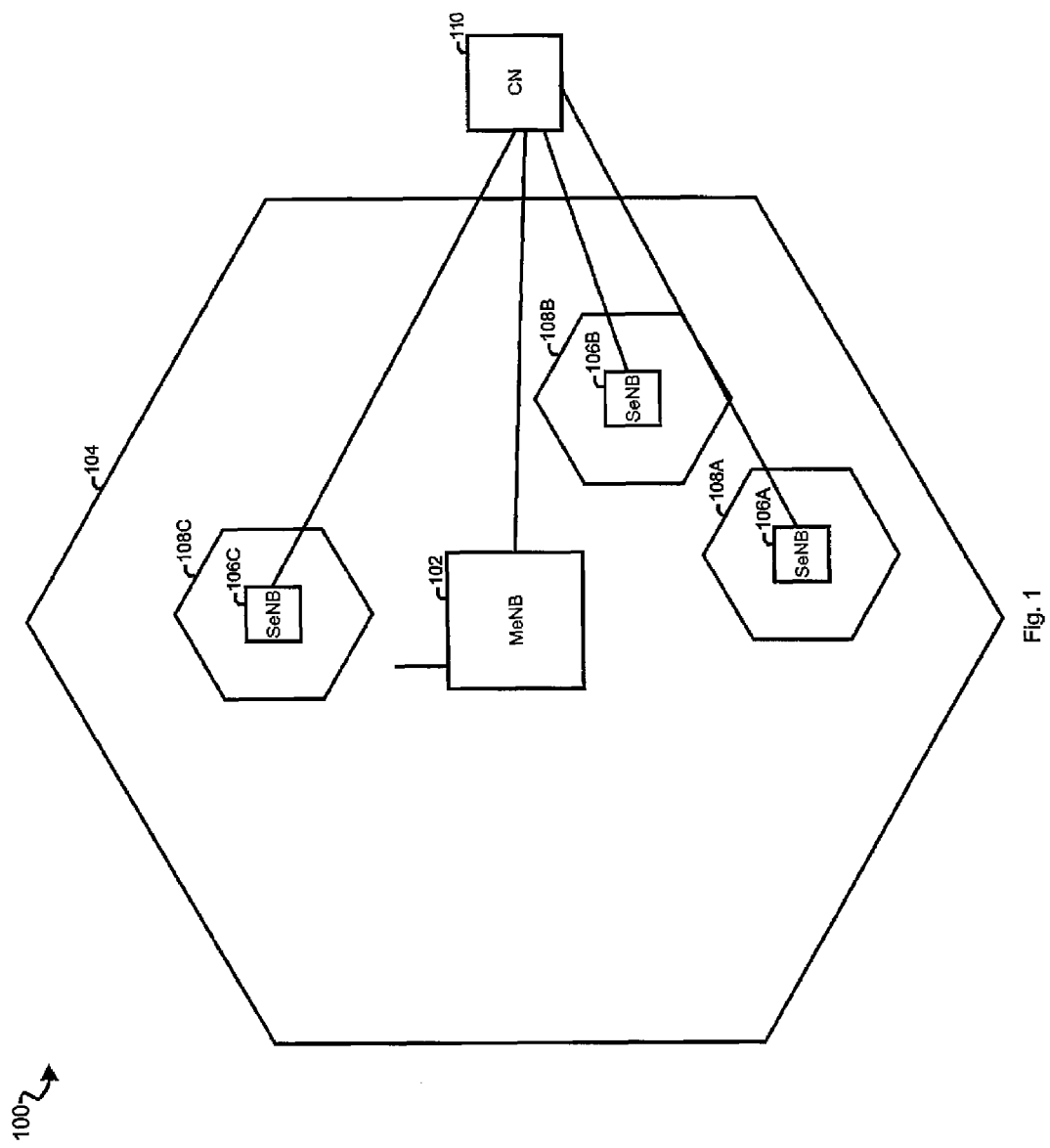
FIG. 1 illustrates a network according to an embodiment of the present invention.

FIG. 1 illustrates a wireless network 100 according to an embodiment of the present invention. The network 100 comprises a macro eNB 102, defining a macro cell 104, as well as pico eNBs 106A-106C, defining pico cells 108A-108C, respectively. The network 100 further includes a core network 110, connected to the macro eNB 102 and the pico eNBs 106A-106C, providing access to communication services. The network 100 serves UEs 112A-112E, which are all present in the macro cell 104, and are also distributed among the pico cells 108A-108C. Each of the UEs is connected both to the macro cell 104 and to the pico cell in which it is also present.

Embodiments of the present invention provide improved techniques for managing radio bearers in dual connectivity such as that employed by the network 100 of FIG. 1. In an exemplary embodiment, the network 100 employs an S1-U (Evolved UTRAN to SGW) interface for a macro eNB and for each secondary eNB.

Figure 2:
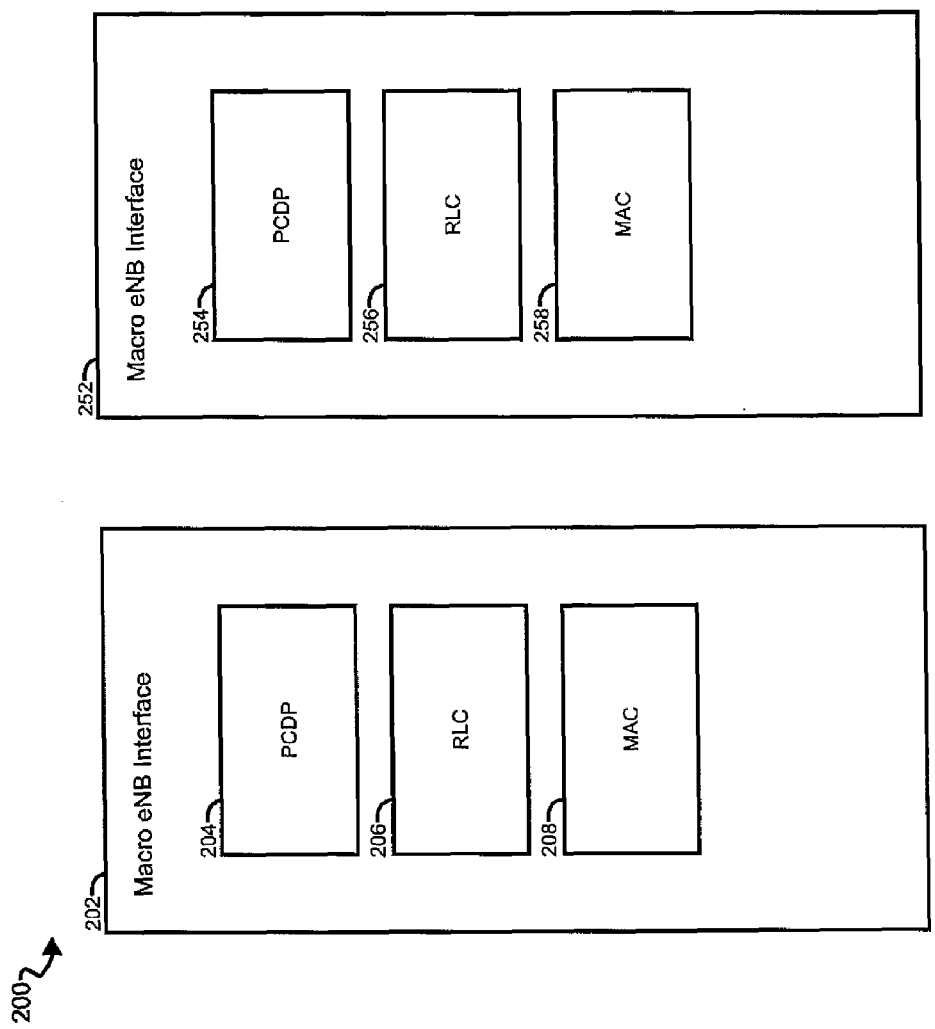
FIG. 2 illustrates a diagram showing an interface between core network and radio access network elements according to an embodiment of the present invention.

FIG. 2 presents a diagram 200 illustrating such an interface in the downlink direction. The macro eNB interface 202 comprises packet data control protocol (PDCP), radio link control (RLC), and media access control (MAC) elements 204, 206, and 208, respectively, and the secondary eNB interface 252 comprises packet data control protocol (PDCP), radio link control (RLC), and media access control (MAC) elements 254, 256, and 258, respectively. The interfaces 202 and 252 terminate in independent PDCPs with no bearer split. Embodiments of the present invention address mechanisms for establishing and using radio bearers. In two alternative high-level models, either the bearers belong to the same packet data network connection and use the same IP address, or the bearers belong to different PDN connections and use different IP addresses.

A core network such as the core network 110 can initiate a creation of a dedicated bearer (for example, based on the deep packet inspection in the Traffic Detection Function (TDF) or packet gateway (PGW). Alternatively, a UE is able to use the non-access stratum (NAS) protocol to request a bearer resource modification from the network (such as the network 100) and the network can decide to create a dedicated bearer based on the request. A TFT is then updated in the PGW which maps portions of the downlink (DL) traffic to the dedicated bearer. The updated TFT is also sent to the UE and the UE uses the updated TFT to map portions of the UL traffic into the newly established bearer. However, the TFT can only consist of static filter criteria such as remote IP address and port, and DSCP value. Using the remote IP address and port as a criterion to select whether the UL or DL packet should use MeNB or SeNB introduces a number of difficulties. For example:

1. If the service uses multiple simultaneous TCP connections to different addresses/ports, then some of these connections can be forced to use the MeNB and some to use the SeNB. However, the UE and the IP server create these connections in a dynamic manner. The PGW (or TDF) are generally unable to recognize the purpose of these connections (especially when TLS is used), or how much bandwidth they would require, so it is very challenging to update the TFT every time a new connection is created or an old one is removed, and at the time the connection is created, the core network cannot know whether a pico or a macro cell would be more suitable for a particular TCP connection at the time when the connection is created.
2. Because the radio conditions and eNB load vary over time, it may happen that the eNBs (MeNB and SeNB) will experience a degradation or improvement in radio conditions so that one degrades or improves with respect to the other. The TFT may need to be updated to transfer one or more TCP connections from the eNB whose radio conditions have degenerated to the relatively better one. Updating the TFT and sending it to the UE requires RRC/NAS signaling over the air, and this increase signaling load may introduce a performance issue if the TFT is updated very often.
3. If the TCP connections use the same IP address/port and DSCP value, the TFT is not able to distinguish these flows.

Therefore, if multiple bearers in a single PDN connection are used, and the operator seeks a solution to increase the throughput for an UE, the solution is limited to scenarios when the UE uses multiple simultaneous services which can be clearly distinguished by the core network and in the TFT, (for example, MNO hosted services, or services that use a dedicated APN such as Voice over IP service (VoLTE). These services could use the bearer(s) via MeNB and the rest of the traffic would be considered as bulk data (best effort Internet services) and use the bearer via SeNB.

Embodiments of the present invention expand the use of multiple bearers by implementing solutions for multiple simultaneous Internet services which cannot be distinguished from each other by the MNO core network.

Another approach, known as Multipath TCP (mptcp) allows multiple link-level connections to be multiplexed into a single, regular TCP/IP network socket as seen by an application. In one approach to mptcp, referred to as Alternative 1A described in 3GPP technical report TR 36.842, radio bearers need to be associated with separate IP addresses: that is, separate PDN connections would be needed via the MeNB and the SeNB. Separate PDN connections have distinct IP addresses and thus could be used as alternative parallel connections in mptcp, and embodiments of the present invention provide a number of enhancements enabling mptcp to be used with Alt 1A.

Embodiments of the present invention enhance the Dual Connectivity Alternative 1A to support simultaneous connectivity via macro and small cells in order to improve data throughput for a UE. In one or more embodiments of the invention, a UE is configured to use an NAS level indication to indicate its preparedness to initiate a second, or alternative, PDN connection for the same APN and thereby obtain a second IP address that can be used for alternative multipath TCP (mptcp) connection. Core network procedures are provided to authorize the establishment of the alternative mptcp connection, and to indicate to the RAN (MeNB) that the established bearer is to be used for alternative mptcp connection. Radio access network (RAN) procedures are provided to define this bearer level indication and use it for a decision criterion to determine whether a particular bearer is handed over to the secondary eNB (and small cell) so as to increase the throughput for an UE that has connectivity via macro and small cells.

Further embodiments of the invention provide for a second, dynamic, model where bearer usage is optimized; the bearer used for alternative mptcp connection is established only when the small cell becomes available and when the operator allows the use of mptcp for throughput increase. When the small cell is no longer available the bearers are released.

This dynamic model provides for additional enhancement to a baseline static model. In this model, the core network procedures are enhanced so that the UE is able to indicate to the network that it is able and willing to use mptcp for a particular APN. The core network indicates to the UE that the network allows the UE to use mptcp for throughput increase, and the UE uses this indication to decide whether to establish the alternative PDN connection to the existing APN.

One or more embodiments of the invention provide mechanisms to support mptcp and multiple alternative TCP connections. Exemplary embodiments employ one or both of a static and a dynamic model. In the static model, all PDN connections (and EPS bearers) related to the mptcp connections are established at the same time—for example, when a UE attaches to a network. If the UE is not within the coverage of any pico cell, all bearers are connected via the MeNB. In the dynamic model, an alternative PDN connection is established only when the SeNB becomes available and the UE is in an RRC connected state—that is, when the UE is transferring data. The alternative connection is released when the UE loses the connection to the SeNB while in an RRC connected state.

Figure 3:
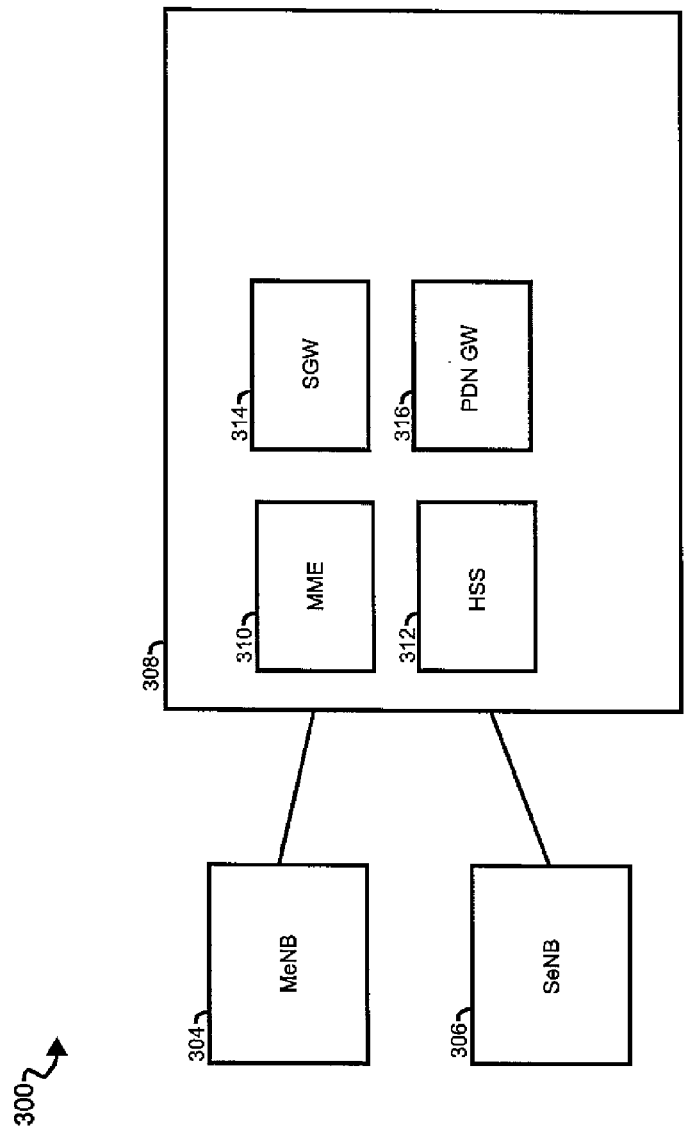
FIG. 3 illustrates a functional diagram of a network 300 according to an embodiment of the present invention.

FIG. 3 illustrates a functional diagram of a network 300, serving a UE 302. The network 300 comprises an MeNB 304, an SeNB 306, and a core network 308. The core network 308 includes a mobility management entity (MME) 310. The network 300 further includes a home subscriber server (HSS) 312, as well as a serving gateway (SGW) 314 and a PDN gateway (PDN GW) 316.

Following are descriptions of capabilities and procedures for implementing the static and the dynamic model. In an approach using the static model, the UE 302 is able to use the non-access stratum (NAS) to make a packet data network (PDN) connectivity request to the MME 310, indicating that the requested PDN is a parallel alternative connection to an existing PDN connection to the same access point name (APN). In one approach, a prefix can be included in the access point name (for example, APN1=internet, APN2-alt1.internet), with the later portion after the prefix indicating the actual APN network identifier. In addition or as an alternative, a new value may be designed for the "request type" information element (IE) described in 3GPP technical specifications (for example, request type="alternative PDN connection". This information can also be provided implicitly by allowing the UE 302 to request multiple PDN connections to the same PDN with the same PDN type, with the core network 308 being configured to interpret the requests as requests for alternative connections, as opposed to core network configurations that interpret the requests as requests for simultaneous connections of different PDN types (for example, simultaneous connections with IPv4 and IPv6 address types).

As a further alternative, the MME 310 may obtain validation from the home subscriber server 312 that multiple connections to the same APN can be used for alternative TCP connections. The HSS 312 may be configured with an APN level attribute to specify whether or not alternative connections are valid.

If the MME 310 accepts the request for alternative PDN connection, the MME sends the Create Session Request to the SGW 314, which then sends it to the PDN GW 316.

The core network 310 is able to indicate to the radio access network (RAN), embodied here by the MeNB 304, that the two or more bearers are used for alternative parallel connections, so that the MeNB 304 knows how to best optimize throughput, and knows which bearers are available to be transferred to the SeNB 306 when the UE 302 is in radio coverage of the SeNB 306. This may be implemented by adding an indication specifying an alternative connection into the Create Session Response from the PDN GW 316 to the SGW 314 and from the SGW 314 to the MME 310. The indication could be, for example, a reference from the alternative (secondary) EPS bearer to the master EPS bearer identity. The MME 210 stores the alternative connection indication into the bearer context, and includes the indication in a Bearer Setup Request sent from the MME 210 to the MeNB 204 via an Si interface. The MeNB 304 stores the indication into the UE radio bearer context. The MME 310 also sends an NAS: Activate Default Bearer Context Request to the MeNB 304, and the MeNB 304 sends the RRC Connection Reconfiguration to the UE 202.

At this point, the MeNB 304 uses a radio resource control (RRC) procedure to configure the bearer to belong to an MCG (Master Cell Group): that is, a user plane (S1-U) to be connected via the MeNB 304.

Additionally, bearer level quality of service (QoS) parameters (for example, as configured in the QoS profile for the default bearer in the HSS 312) can be used to instruct the eNB 302 to unequally weight the throughput and scheduling priority of bearers belonging to the same mptcp connection: for example, via setting the aggregate maximum bit rate and QoS class identifier (QCI) parameters of the bearers into different values.

If the UE 302 moves to the coverage area of the SeNB 306, the UE sends the corresponding measurement report to the MeNB 304. The MeNB 304 then uses the previously received bearer level indication as a criterion to decide whether a particular bearer is handed-over to the SeNB 206. The MeNB 204 may decide to initiate a handover procedure from the MeNB 204 to the SeNB 206 for the bearer carrying the alternative mptcp connection, and keep the accompanying bearer of the same mptcp connection in the MeNB 204 in order to increase the throughput for a UE such as the UE 302. At this point the MeNB 304 also changes the configuration of the handed-over radio bearer from the MCG to SCG (Secondary Cell Group) and indicates this change to the UE in a radio resource control (RRC) procedure.

In the dynamic model (as noted above), an alternative packet data network (PDN) connection is established only when the SeNB becomes available while the UE is in a radio resource control (RRC) connected state—that is, when the UE is transferring data. The alternative connection is released when the UE loses the connection to the SeNB while in an RRC connected state.

In one exemplary embodiment, a network such as the network 300 may operate as follows in following the dynamic model approach. In implementing the dynamic model, the network 300 includes a number of features and performs a number of operations similar or identical to those described above, and implements a number of additional capabilities.

In a dynamic model implementation, the UE 302 is able to use the non-access stratum (NAS) to make a packet data network (PDN) connectivity request to the MME 310, indicating that the requested PDN is a parallel alternative connection for an existing PDN connection to the same access point name (APN). The UE 302 is able to indicate in the NAS level that it is capable of mptcp and ready to use mptcp to connect to a particular APN when possible. Such an indication may be included in an NAS:PDN connectivity request (for example, in a request type "alternative PDN connection preferred" described above) when a request is made to establish the first PDN connection. The MME 310 may then authorize the request, with the authorization being sent from the MME 310 to the SGW 314 and from the SGW 314 to the PDN GW 316. This can be accomplished in the manner described above with respect to the static model.

The indication is stored in the EPS bearer context in the MME 310, and is carried from the MME 310 to the MeNB 304. The MeNB 304 stores the indication in the radio bearer context.

At this point, the UE 302 has one PDN connection with one MGC bearer. The SeNB 306 is not yet available for the UE 302.

When the SeNB 306 becomes available, the MeNB 304 is able to indicate to the UE 302 (in an RRC connected state) that the SeNB 306 is available, so that the UE is aware that it should establish a new PDN connection. In one exemplary approach, the UE 302 is configured to interpret a change from the MCG bearer to the SCG bearer as an indication that the SeNB 306 has become available for the UE 302. Additional information is also conveyed to the UE 302 so that the UE 302 does not automatically use the SeNB 306 in every case in which a bearer is offloaded to the SeNB 306. In cases in which the MeNB 304 is configured to offload all bearers to the SeNB 306 whenever possible, for the UE to blindly switch to the SeNB 306 in such cases may lead to unnecessary switching with no increase in throughput. The MME 310, then, is configured to indicate whether use of mptcp is permitted—for example, by including "mptcp permitted" or "mptcp not permitted" entries in the response to the initial PDN connectivity request. The UE 202, then, may send a first PDN connectivity request and receive a response to the request from the MME 310. This response may include the "mptcp permitted" or "mptcp not permitted" indication. The UE 302 establishes the first PDN connection and establishes the second PDN connection only if the response from the MME 310 includes the "mptcp permitted" indication.

Suppose that the UE 302 requests a second PDN connection. In ordinary circumstances, the MME 310 will accept the request, because the UE 302 would not have made the request if the second PDN connection were not permitted. As with the static model, the MME 310 sends a create session request to the SGW 314, which sends the request to the PDN GW 316, with the create session request indicating the request type.

In the present example, the bearer of the first PDN connection was already handed over to the SeNB 306, and the MeNB 304 maintains the bearer of the second MeNB connection itself. If the UE 302 is about to lose its radio connection to the SeNB 306, the MeNB 304 initiates a handover for all the radio bearers in the SeNB 306. When the UE 302 determines that both bearers being used as alternative PDN connections to the same APN have been handed over to the MeNB 304, the UE 302 is able to release the second PDN connection because it is not needed for throughput increase (because at this point the connection with the SeNB 206 has been lost so that if two connections were maintained, both the first and second connections would be with the MeNB 304). The UE 302 detects this condition from the bearer configuration change from SCG bearer to MCG bearer.

In another embodiment of the invention, as an alternative of or in addition to the NAS level negotiation described above, control of the second PDN connection (and whether or not mptcp is allows) can be negotiated in RRC. The MeNB 304 determines (based, for example, on the UE's capability and indication or readiness for mptcp) whether or not a second PDN indication is preferred. In the present example, the MeNB 304 may use an RRC information element to communicate to the UE 302 whether or not a second PDN connection is preferred. If a second PDN connection is preferred, the UE 302 establishes a second PDN connection. In this way, the MeNB 304 controls the PDN connection, and the decisions and indications relating to establishing the second PDN connection are independent from the SeNB configuration. The same RRC message can be used to configure the SCG and request the UE to establish the second PDN connection. When the SCG bearer is reconfigured as an MCG bearer (that is, moved to the MeNB 304) the MeNB 304 is able to indicate to the UE 302 in the same procedure that the UE 302 should refrain from releasing the PDN connection, because the MeNB 304 may shortly use another SeNB.

Figure 4:
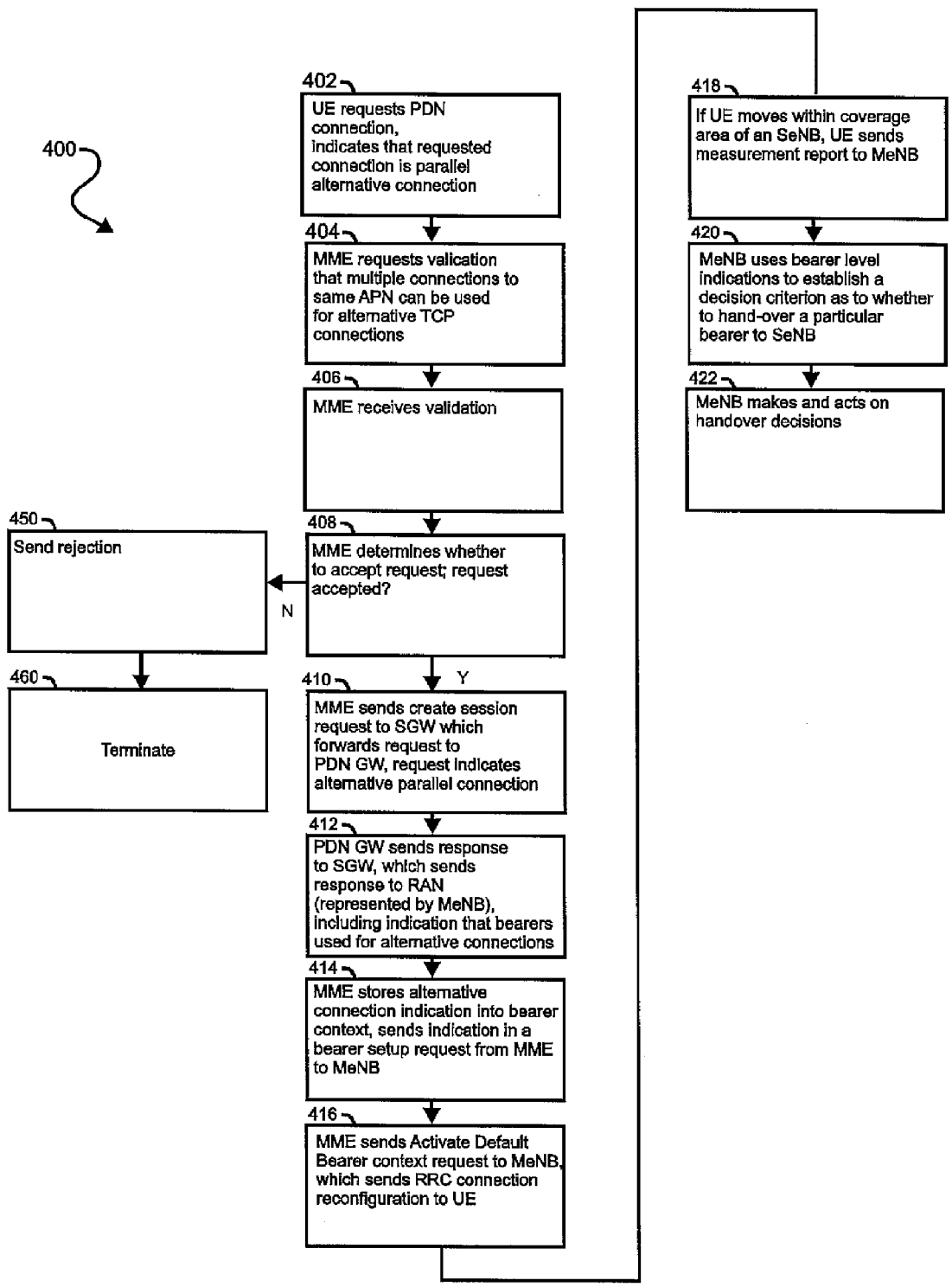
FIGS. 4 and 5 illustrate processes according to embodiments of the present invention.

FIG. 4 illustrates a process 400 according to an embodiment of the present invention, using a static model for establishing mptcp connections. At block 402, a UE requests connection to a network comprising an MeNB and one or more SeNBs. The request includes an indication to the core network (for example, in a NAS PDN connectivity request including indicia such as a prefix indicating that the connection is an alternative connection) that the requested PDN connection is a parallel alternative connection for an existing PDN connection to the same APN. At block 404, the MME requests validation that multiple connections to the same APN can be used for alternative TCP connections, suitably by querying the home subscriber server (HSS). At block 406, the MME receives validation that multiple connections are allowed (suitably through a response from the HSS, with the response including an APN level attribute.

Based on the response from the HSS, the MME determines at block 408 whether to accept the request for alternative PDN connection. If the request is rejected, the process proceeds to block 450 and a rejection is sent, and the process terminates at block 460. If the request is accepted, the process proceeds to block 410 and the MME sends a create session request to the serving gateway, which forwards the create session request to the PDN gateway. The create session request includes an indication that the PDN connection is an alternative parallel connection. The indication may be similar to the indication in the connection request from the UE, discussed in connection with block 402.

At block 412, the PDN gateway sends a response to the serving gateway and the serving gateway sends the response to the radio access network (which may be represented by the MeNB). The response provides information indicating that two or more bearers are used for alternative parallel connections. This information may come in the form of an indication in the create session response from the PDN gateway to the serving gateway and from the serving gateway to the MME. As noted above, the indication may be a reference from the alternative EPS bearer to the master EPS bearer identity.

At block 414, the MME stores the alternative connection indication into the bearer context, and sends the indication in a bearer setup request from the MME to the MeNB. At block 416, The MME also sends an NAS:Activate Default Bearer context Request to the MeNB and the MeNB sends an RRC connection reconfiguration to the UE, using an RRC procedure to configure the bearer to belong to a master cell group.

As noted above, bearer level quality of service parameters can be used to instruct the MeNB to unequally weight throughput and scheduling priority of bearers belonging to the same mptcp connection.

At block 418, if the UE moves within the coverage area of an SeNB, the UE sends a measurement report to the MeNB, and at block 420 the MeNB uses bearer level indications to establish a decision criterion as to whether to hand-over a particular bearer to the SeNB. At block 422, the MeNB makes and acts on handover decisions, indicating any configuration changes to the UE in an RRC procedure.

Figure 5:
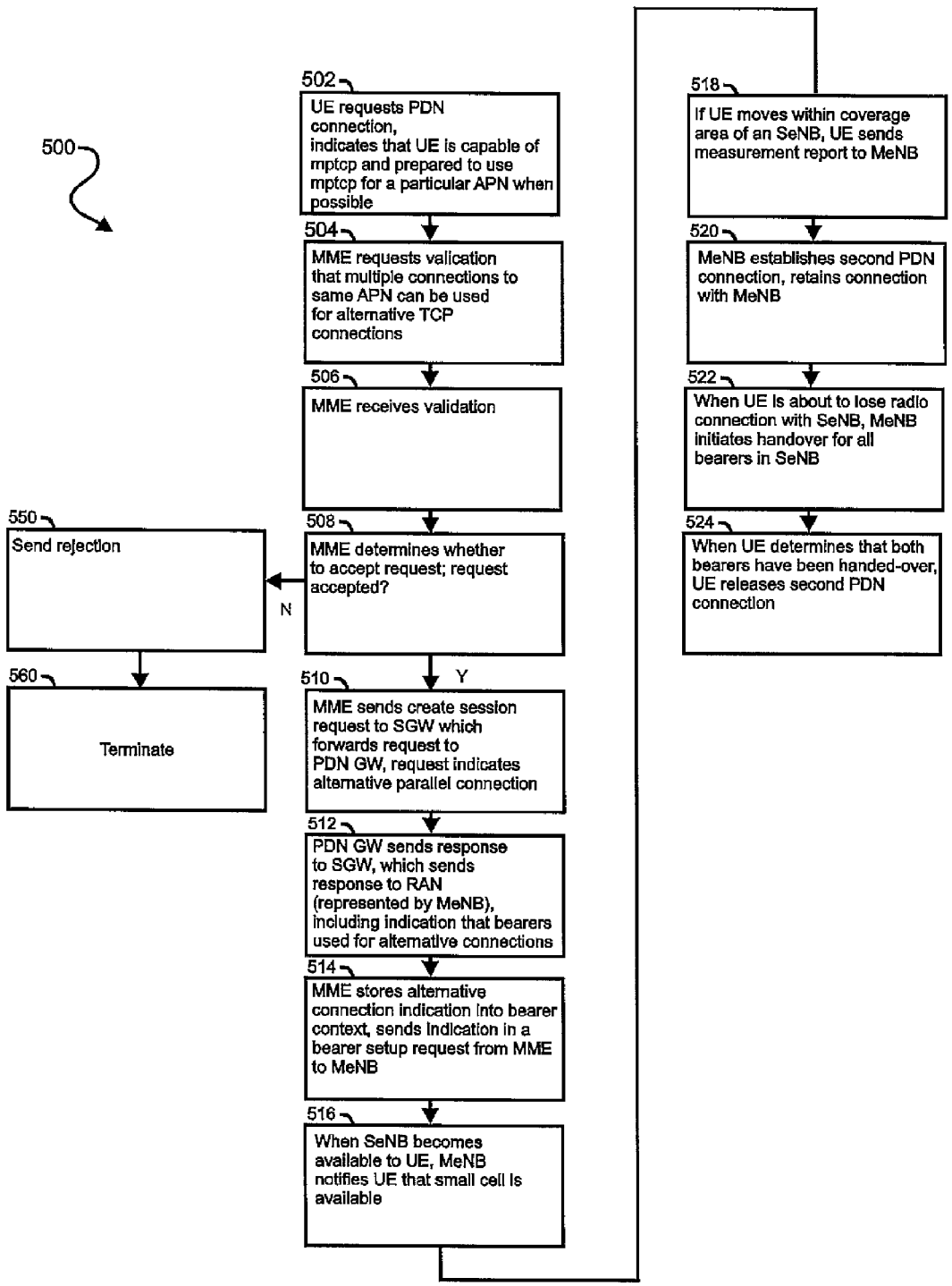

FIG. 5 illustrates a process 500 according to an embodiment of the present invention, using the dynamic model described above for mptcp connections.

At block 502, a UE requests connection to a network comprising an MeNB and one or more SeNBs. The request includes an indication to the core network that the UE is capable of mptcp and prepared to use mptcp for connection to a particular APN when possible (for example in a request type "alternative pdn connection preferred" when the first PDN connection is established. At block 504, the MME validates that multiple connections to the same APN can be used for alternative TCP connections, and at block 506, the MME receives validation that multiple connections are allowed.

The MME determines at block 508 whether to accept the request for alternative PDN connection. If the request is rejected, the process proceeds to block 550 and a rejection is sent, and the process terminates at block 560. If the request is accepted, the process proceeds to block 510 and the MME sends a create session request to the serving gateway, and the serving gateway forwards the create session request to the PDN gateway, with the create session request being configured similarly to that of block 410 of FIG. 4 discussed above.

At block 512 (similarly to block 412 discussed above), the PDN gateway sends a response to the serving gateway and the serving gateway sends the response to the radio access network (which may be represented by the MeNB). The response provides information indicating that two or more bearers are used for alternative parallel connections. This information may come in the form of an indication in the create session response from the PDN gateway to the serving gateway and from the serving gateway to the MME. As noted above, the indication may be a reference from the alternative EPS bearer to the master EPS bearer identity.

At block 514, the MME stores the alternative connection indication into the radio bearer context. At this point, the UE has one connection with one MGC bearer via the MeNB, but the SeNB (small cell) is not yet available for the UE.

When the small cell, that is, the SeNB, becomes available to the UE, the process proceeds to block 516 and the MeNB notifies the UE that the small cell is available. The notification may include an indication enabling the UE to take steps to establish a new alternative PDN connection. The indication may use recognition of the radio bearer configuration change from MCG bearer to SCG bearer, together with the presence or absence of an indication that the operator allows the use of mptcp for throughput increase. At block 518, upon receiving the notification, the UE may hand-over from the MeNB to the SeNB and the MME may also configure an indication of establishment of a second PDN connection and send the indication in a bearer setup request from the MME to the MeNB. At block 520, the MeNB establishes a second PDN connection and, since the first PDN connection was already handed-over to the SeNB, the MeNB retains the second PDN connection. At block 522, when the UE is about to lose radio connection to the SeNB, the MeNB initiates a handover for all bearers in the SeNB. At block 524, when the UE determines that both bearers that are used as alternative connections to the same APN have been handed-over to the MeNB, the UE is able to release the second PDN connection, with the handover being detected, for example, by recognition that the MeNB has changed the bearer configuration from the SCG bearer to the MCG bearer.

FIG. 6 illustrates a base station 600, a user device 630, and a data processing element 650, such as may be used in embodiments of the present invention. The base station 600 and user device 630 may be used, for example, in networks operated by the primary and secondary operators, and the data processing element 650 may be used in various elements of and to perform various functions a core network. The base station 600 comprises a data processor (DP) 602 and memory (MEM) 604, with the memory storing data 606 and one or more programs (PROGS) 608. The base station 600 may communicate using a transmitter 610 and receiver 612, using an antenna 614. The user device 630 comprises a data processor (DP) 632 and memory (MEM) 634, with the memory storing data 636 and one or more programs (PROGS) 638. The user device 630 may communicate using a transmitter 640 and receiver 642, using an antenna 644. The data processing element 650 comprises a data processor (DP) 652 and memory (MEM) 654, with the memory storing data 656 and one or more programs (PROGS) 658. At least one of the PROGs 608 in the base station 600 is assumed to include a set of program instructions that, when executed by the associated DP 602, enable the device to operate in accordance with the exemplary embodiments of this invention, as detailed above. In these regards the exemplary embodiments of this invention may be implemented at least in part by computer software stored on the MEM 604, which is executable by the DP 602 of the base station 600, or by hardware, or by a combination of tangibly stored software and hardware (and tangibly stored firmware). Similarly, at least one of the PROGs 638 in the user device 630 is assumed to include a set of program instructions that, when executed by the associated DP 632, enable the device to operate in accordance with the exemplary embodiments of this invention, as detailed above. In these regards the exemplary embodiments of this invention may be implemented at least in part by computer software stored on the MEM 634, which is executable by the DP 632 of the data processing element 630, or by hardware, or by a combination of tangibly stored software and hardware (and tangibly stored firmware). Similarly, at least one of the PROGs 658 in the data processing element 650 is assumed to include a set of program instructions that, when executed by the associated DP 652, enable the device to operate in accordance with the exemplary embodiments of this invention, as detailed above. In these regards the exemplary embodiments of this invention may be implemented at least in part by computer software stored on the MEM 654, which is executable by the DP 652 of the data processing element 650, or by hardware, or by a combination of tangibly stored software and hardware (and tangibly stored firmware).

An electronic device implementing these aspects of the invention need not be the entire device as depicted at FIG. 1 or FIG. 6, or may be one or more components of same such as the above described tangibly stored software, hardware, firmware and DP, or a system on a chip SOC or an application specific integrated circuit ASIC. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports The MEMS 604, 634, and 654 may be of any type suitable to the local technical environment and may be implemented using any suitable data storage technology, such as semiconductor based memory devices, magnetic memory devices and systems, optical memory devices and systems, fixed memory and removable memory. The DPs 602, 632, and 652 may be of any type suitable to the local technical environment, and may include one or more of general purpose computers, special purpose computers, microprocessors, digital signal processors (DSPs) and processors based on a multi-core processor architecture, as non-limiting examples.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. A method comprising:
   at a core network operating in a wireless communications network comprising a macro base station and one or more secondary base stations, configuring an alternative connection indication, wherein the alternative connection indication specifies that one or more radio bearers assigned to a packet data network connection may he used for an alternative parallel packet data network connection to a single access point name;
   receiving a connection request originating at a user device, wherein the request includes an indication that the user device is able and prepared to use a parallel connection when a secondary base station becomes available; and
   configuring a connection request response including the alternative connection indication, such that the connection request response including the alternative connection indication is provided to the user device in response to the connection request indicating capability and preparedness for the user device to use an alternative packet data network connection to a single access point name.

2. The method of claim 1, further comprising conveying the alternative connection indication to the macro base station, such that the macro base station responds to the connection request from the user device by providing the alternative connection indication to the user device.

3. The method of claim 1, wherein the alternative connection indication is conveyed to the macro base station in a radio bearer context such that the macro base station establishes a bearer for a packet data network connection to the device using a first radio bearer and, upon a determination that the user device is within range of a secondary base station, establishes a bearer for a packet data network connection between the user device and the secondary base station using a second radio bearer.

4. The method of claim 3, wherein the macro base station hands over the second radio bearer to the secondary base station and establishes the second radio bearer for a connection between the user device and the macro base station.

5. The method of claim 1, further comprising conveying the alternative connection indication to the macro base station in a radio hearer context such that the macro base station responds to the connection request from the user device by establishing a bearer for the alternative packet data network connection with the user device, using First and second radio bearers.

6. The method of claim 5, wherein the macro base station transfers one of the first or second radio hearers to a secondary base station upon a determination that network conditions meet criteria for transferring the user device to the secondary base station.

7. The method of claim 3, wherein the radio bearer context defines one or more bearer level quality of service parameters.

8. The method of claim 7, further comprising, when the user device moves within the coverage area of a secondary base station, using the bearer level quality of service parameters to establish a decision criterion used by one base station to determine whether a particular bearer is to be handed over from the macro base station to the secondary base station.

9. An apparatus comprising:
   at least one processor;
   memory storing a program of instructions;
   wherein the memory storing the program of instructions is configured to, with the at least one processor,
   cause the apparatus to at least:
     control a core network operating in a wireless communications network comprising one macro base stations and one or more secondary base stations, to configure an alternative connection indication, wherein the alternative connection indication specifies that one or more radio bearers assigned to a packet data network connection may be used for an alternative parallel packet data network connection to a single access point name;
     control the core network to receive a connection request originating at a user device, wherein the request includes an indication that the user device is able and prepared to use a parallel connection when a secondary base station becomes available; and
     control the core network to configure a connection request response including the alternative connection indication, such that the connection request response including the alternative connection indication is provided to the user device in response to the connection request indicating capability and preference for the user device to use an alternative packet data network connection to a single access point name.

10. The apparatus of claim 9, wherein the apparatus is further caused to control the core network to convey the alternative connection indication to the macro base station, such that the macro base station responds to the connection request from the user device by providing the alternative connection indication to the user device.

11. The apparatus of claim 9, wherein the alternative connection indication is conveyed to the macro base station in a radio bearer context such that the macro base station establishes a bearer for a packet data network connection to the device using a first radio bearer and, upon a determination that the user device is within range of a secondary base station, establishes a bearer for a packet data network connection between the user device and the secondary base station using a second radio bearer.

12. The apparatus of claim 11, wherein the macro base station hands over the second radio bearer to the secondary base station and establishes the second radio bearer for a connection between the user device and the macro base station.

13. The apparatus of claim 9, wherein the apparatus is further caused to control the core network to convey the alternative connection indication to the macro base station in a radio bearer context such that the macro base station responds to the connection request from the user device by establishing a bearer for the alternative packet data network connection with the user device, using first and second radio bearers.

14. The apparatus of claim 13, wherein the macro base station transfers one of the first or second radio bearers to a secondary base station upon a determination that network conditions meet criteria for transferring the user device to the secondary base station.

15. The apparatus of claim 11, wherein the radio bearer context defines one or more bearer level quality of service parameters.

16. The apparatus of claim 15, wherein the apparatus is further caused to control the core network to, when the user device moves within the coverage area of a secondary base station, using the bearer level quality of service parameters to establish a decision criterion used by one base station to determine whether a particular bearer is to be handed over from the macro base station to the secondary base station.

17. An apparatus comprising:
    at least one processor;
    memory storing a program of instructions;
    wherein the memory storing the program of instructions is configured to, with the at least one processor,
    cause the apparatus to at least:
        control a user device to send to a wireless communications network comprising a macro base station and one or more secondary base stations, one or more request for a packet data network connection, wherein at least one of the request comprises an indication that the user device is capable of alternative packet data network connection and prepared to establish an alternative packet data network connection to a single access point name when possible;
        control the user device to establish a packet data network connection with a macro base station using at least a first bearer; and
        control the user device to receive, during establishment of the packet data network connection, an indication from a core network controlling the wireless communications network as to whether or not the user device is allowed to use an alternative packet data connection.

18. The apparatus of claim 17, further configured to establish a second packet data connection with the macro base station using a second bearer, and in response to a handover of the user terminal from the macro based station to a secondary base station, hand over at least one of the first bearer or the second bearer from the macro base station to the secondary base station.

19. The apparatus of claim 17, further configured to upon a determination that the user device is within range of a secondary base station, establish a second bearer for a second packet data network connection between the user device and the secondary base station.

20. The apparatus of claim 19, further configured to release the second packet data network connection upon determination that both the first and the second bearers have been handed over to the macro base station.

* * * * *